US006778348B1

United States Patent
Carley

(10) Patent No.: US 6,778,348 B1
(45) Date of Patent: Aug. 17, 2004

(54) ACCELEROMETER-ASSISTED SERVO WRITING FOR DISK DRIVES

(75) Inventor: L. Richard Carley, Allegheny County, PA (US)

(73) Assignee: IC Mechanics, Inc., Pittsburgh, PA (US)

( * ) Notice: Subject to any disclaimer, the term of this patent is extended or adjusted under 35 U.S.C. 154(b) by 317 days.

(21) Appl. No.: 09/648,859

(22) Filed: Aug. 25, 2000

(51) Int. Cl.[7] ............................................. G11B 21/02
(52) U.S. Cl. .................................................. 360/75
(58) Field of Search ............................... 360/75, 77.03, 360/31, 77.02, 77.05, 77.08

(56) References Cited

U.S. PATENT DOCUMENTS

| | | | |
|---|---|---|---|
| 4,703,371 A | | 10/1987 | Redmond et al. |
| 4,969,056 A | | 11/1990 | Negishi et al. |
| 5,122,908 A | * | 6/1992 | Sporer ........................ 359/557 |
| 5,315,372 A | | 5/1994 | Tsai |
| 5,319,509 A | | 6/1994 | Michelson et al. |
| 5,325,245 A | | 6/1994 | Shimizu et al. |
| 5,325,349 A | | 6/1994 | Taniguchi |
| 5,339,204 A | | 8/1994 | James et al. |
| 5,416,652 A | | 5/1995 | Lewis |
| 5,610,777 A | * | 3/1997 | Dang et al. .............. 360/77.03 |
| 5,862,015 A | | 1/1999 | Evans et al. |
| 6,064,540 A | | 5/2000 | Huang et al. |
| 6,188,537 B1 | * | 2/2001 | Eland et al. .................. 360/75 |
| 6,307,702 B1 | * | 10/2001 | Fukushi et al. ............... 360/75 |
| 6,335,845 B1 | * | 1/2002 | Yamaguchi et al. .......... 360/75 |
| 6,407,876 B1 | * | 6/2002 | Yamaguchi et al. .......... 360/75 |
| 6,469,859 B1 | * | 10/2002 | Chainer et al. ............... 360/75 |
| 6,476,989 B1 | * | 11/2002 | Chainer et al. ............... 360/31 |
| 6,519,107 B1 | * | 2/2003 | Ehrlich et al. ................ 360/75 |
| 6,522,488 B2 | * | 2/2003 | Sasamoto et al. ............. 360/31 |
| 6,522,493 B1 | * | 2/2003 | Dobbek et al. ............... 360/75 |
| 6,522,494 B1 | * | 2/2003 | Magee ........................ 360/75 |

* cited by examiner

*Primary Examiner*—David Hudspeth
*Assistant Examiner*—Fred F. Tzeng
(74) *Attorney, Agent, or Firm*—McDermott, Will & Emery

(57) ABSTRACT

This invention discloses a method for facilitating the writing of sector servo marks on disk drives that makes use of an inertial sensor mounted on the positioning arm of the disk drive. In addition, this patent discloses several operating strategies that enhance the accuracy of the inertial sensor when it is used to write sector servo marks.

35 Claims, 3 Drawing Sheets

Figure 1:
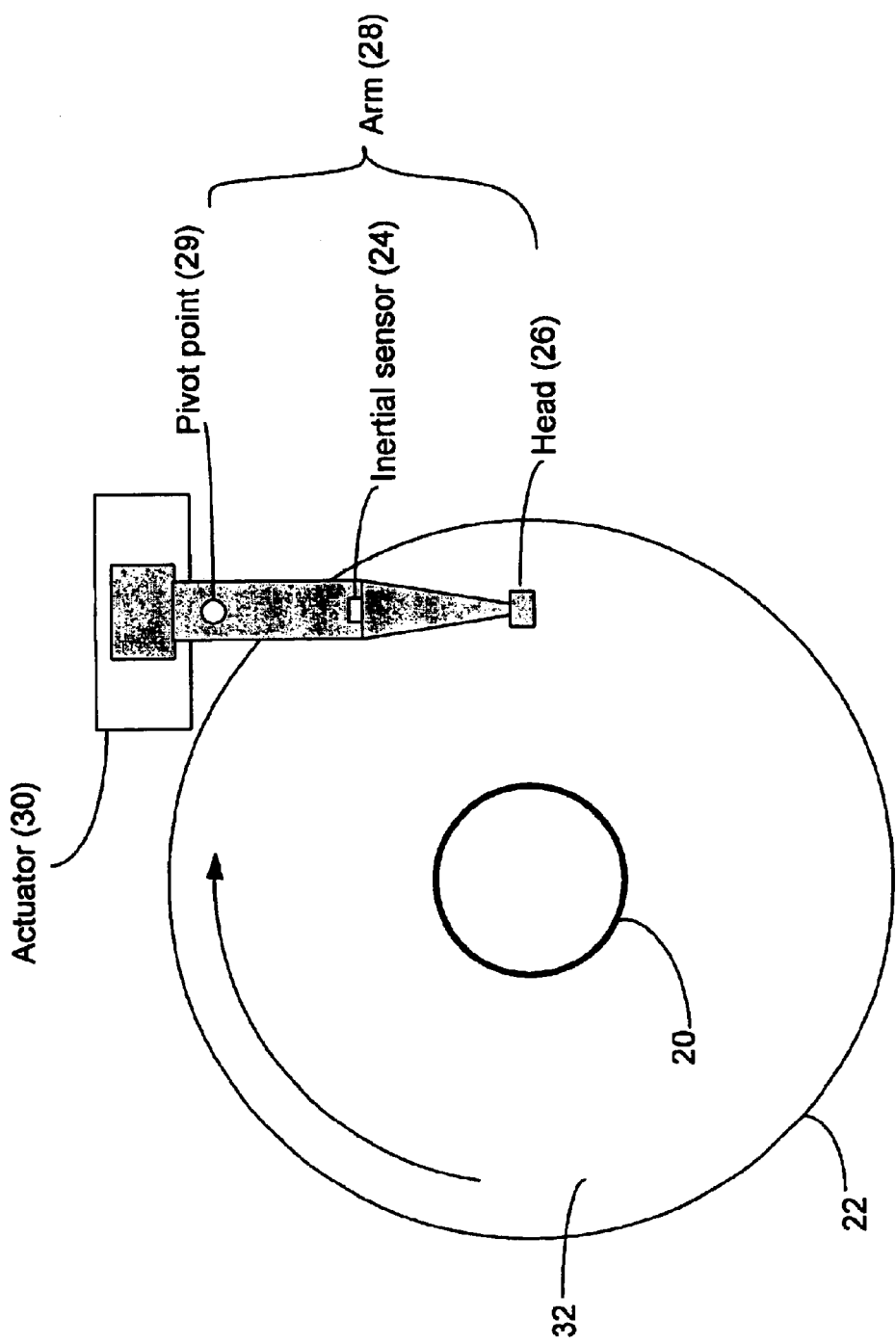

Inertial Sensor Package - Fixed to Arm

Basic model for 1-axis inertial sensor

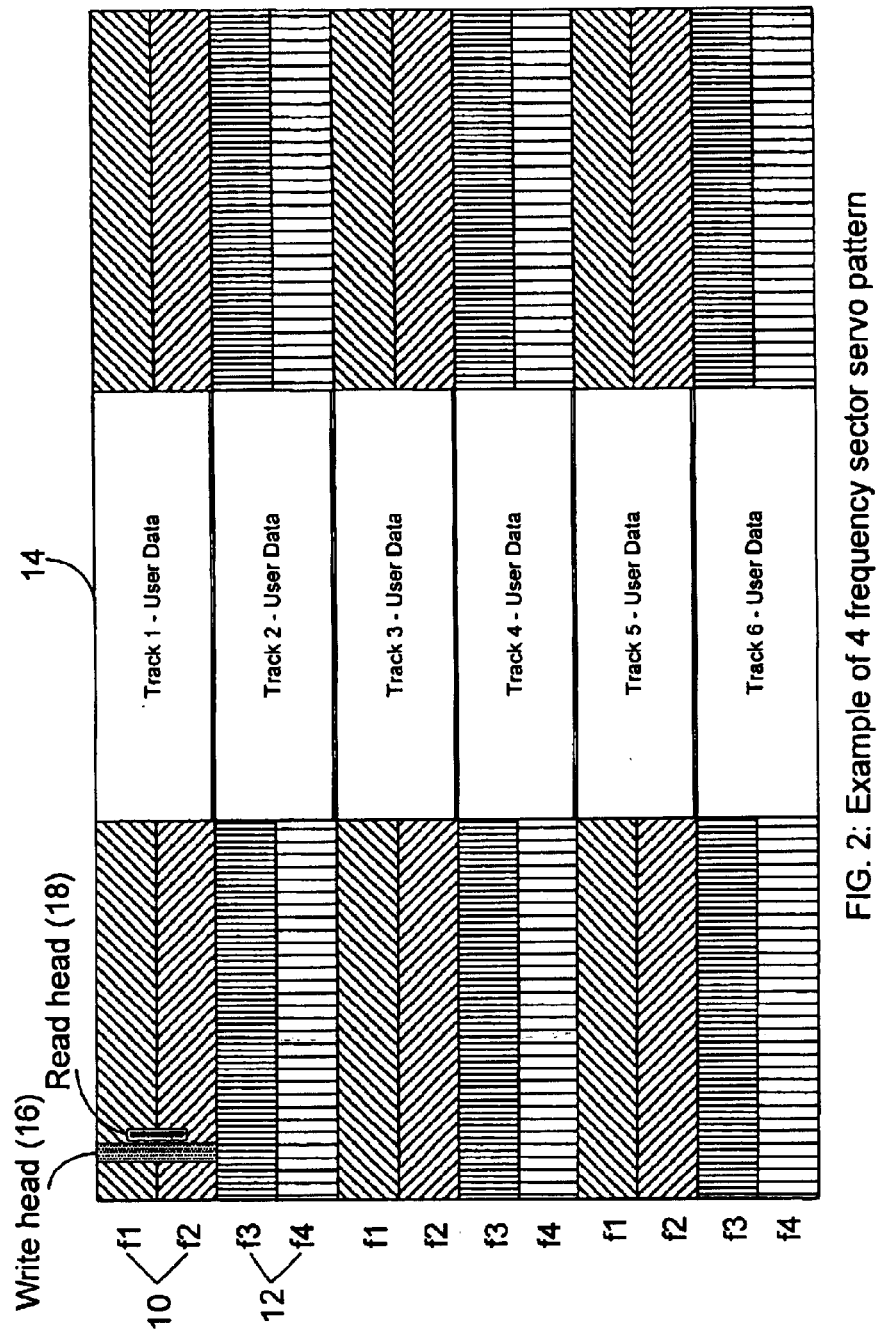
FIG. 2: Example of 4 frequency sector servo pattern

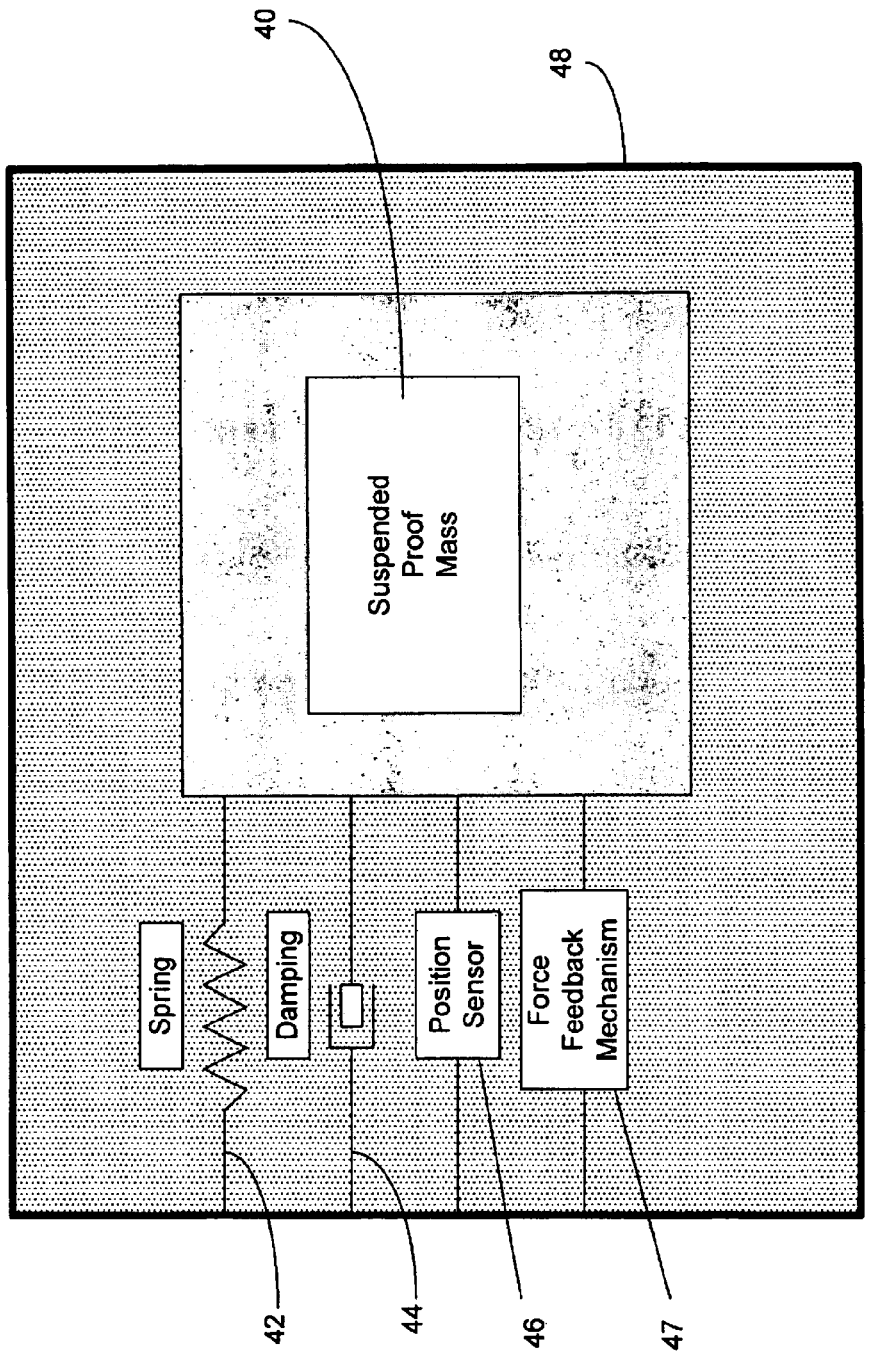
FIG. 3: Basic model for 1-axis inertial sensor

ACCELEROMETER-ASSISTED SERVO WRITING FOR DISK DRIVES

FIELD OF THE INVENTION

This invention relates to the writing of sector servo patterns on disk drives, and in particular, to an improved method for writing such patterns using an inertial sensor to position the head of the drive during writing.

BACKGROUND OF THE INVENTION

This disclosure relates to the general problem of writing sector servo patterns on hard disk drives. Today, nearly all disk drives rely on sector servo patterns for accurately controlling the position of the head during both reading and writing. The head flies over a specially written servo burst that provides it with an extremely accurate indication of the head's position relative to the track center. Assuming that the head is close to the center of the track, it can then either read or write the following data sector. If the head is off track, corrective feedback is applied by the servo loop using the voice-coil actuator. As long as the frequency with which the head flies over sector servo bursts is high enough, the head can be kept at the center of the track to within a small fraction of the track width.

Typically these servo bursts are quite complicated patterns that are written by the same write head normally used in the disk drive to read and write data. One typical pattern is to write the inner half of the track with a tone at one frequency and the outer half of the track with a tone at a second frequency. Because the head always writes a full track width, this pattern must be written from the inside to the outside (or vice versa) with the head stepping over by just half a track each time the frequency is switched. More advanced disk drives sometimes use more complicated servo marks. For example, patterns that make use of three or four distinct frequencies can be used instead of using just two frequencies.

Generally, to write servo marks, the head is moved to a precise radius and then held at that radius while a sequence of patterns is written for each of the sector servo marks in that track, as the disk rotates. After a full rotation, the head must be moved inward or outward by a precise amount and then held at that exact radius while sector servo marks for the next track are written.

Currently, nearly all hard disk drives have the sector servo pattern written onto the disk using its own heads, using a laser interferometer to sense the position of the head. During the servo writing process, which is typically done shortly after the drive is manufactured, the disk is typically spun at a fraction of its normal rotational speed (typically about half of the normal operating speed) to minimize bearing vibrations and air turbulence vibrations. To isolate the disk drive from external vibrations the servo writing process is typically carried out in a vibration damped environment.

The fact that the track density of disk drives is increasing rapidly presents a problem with the current state of the art practice. A disk drive that has 40,000 tracks and operates at a rotational speed of 12,000 RPM, with a simple dual frequency servo pattern, would require at least 400 seconds, or over 6 minutes, to complete the writing of the servo pattern. As track densities increase, this time scales up linearly, which could make servo writing the most expensive step in manufacturing a disk drive.

In the early days of disk drives, positioning of the read/write head was done using stepper motors. The position of the arm was precisely known by the number and direction of step commands that had been given to the stepper motor. Because of this feature, early disk drives were capable of self servo writing, even in the field (this was called the "format" command). As voice-coil motors replaced the stepper motors, it became necessary to have some kind of additional track position reference. Although many different ways have been developed to provide this position reference, the use of a laser interferometer based sensor to control the head position and the one-time writing of dedicated servo marks has emerged as the industry standard approach.

Because of the high cost of time on today's laser interferometer based servo writing machines, there have long been efforts to create a "self servo writing" mechanism that allows the disk drive to write the sector servo patterns itself, without the use of a stepper motor to set the position of the head.

There are several problems with current methods of doing self-servo writing without the use of a stepper motor. One such problem involves the positioning of the write head as the marks are written on the disk. After a single mark is written, the write head must be held motionless until the spot on the disk for the next mark rotates under the write head. Because there is no inertial frame of reference, the write head is "open loop" for this period of time. As a result, a certain percentage error in the positioning of the write head occurs, usually not more than one percent (1%) per track. However, the positioning error in each track is cumulative over the entire surface of the disk, and, as a result, large errors may be induced near the outside diameter of the disk, with the result that the tracks near the outside diameter of the disk may be untrackable by the read head of the drive.

As an example, if the first track of a disk drive is written near the inside diameter of the disk using the inside crash stop as a reference, the sector servo marks in the first track can be written in a fairly accurate manner. However, as the write head moves outward to write the sector servo marks on the next track, the only reference the head has as to where to write the second track of sector servo marks is the previous track. It is not unlikely that positioning errors of up to one (1%) percent per track could occur as the write head moves outwardly from track to track. To further complicate the process, the write head moves in an "open-loop" fashion from servo mark to servo mark as it writes the servo marks on the current track. Certain forces acting upon the write head, such as windage caused by the spinning of the disk and forces exerted by, for example, the cable attached to the write head are likely to cause positioning errors even between servo marks in the same track.

It is therefore desirable to provide a method of writing sector server marks that eliminates or minimizes positioning errors.

SUMMARY OF THE INVENTION

The present invention consists essentially of providing an inertial sensor to sense any acceleration forces applied to the head. Preferably, the inertial sensor is positioned on the arm to which the head is attached.

The head preferably holds a constant radial position as servo marks in the same track are written. Heads on current state-of-the-art drives are unable to do this for more than the distance circumferentially between one or two sector servo marks even when drive current to the actuator is turned off because of residual forces due to air moving by the head (windage forces) and drag from the cable attaching the arm electronics to the rest of the drive. That is, the head can be assumed to remain at a fixed radius when the actuator drive current is turned off only for a period of time corresponding to the time between one or two sector servo bursts. The inertial sensor is able to detect inward or outward motions of the head and, using a force feedback mechanism, is able to eliminate or minimize there radial movements of the head as servo marks in the same track are written for periods much longer than the time between sector servo bursts.

The inertial sensor is also used when moving the head to a different track. A calibration process, described in detail later, can be used to calculate a combination of accelerating and decelerating forces that can be applied to the head to move it from its current position to the correct position for the writing of the next track. When it is time to move the head to the next track, an accelerating force is applied to the head for a predetermined period of time, guided by the inertial sensor. Then a decelerating force is applied for a precise period of time to stop the movement of the head. The result is that the head will be resting over the portion of the disk on which the servo marks for the next track are to be written. When the new position is reached, the previously described force feedback mechanism is used to keep the head from deviating from the radial position of the new track. Alternatively, the internal force actuators within the inertial sensor can be used to move the proof mass that is part of the sensor over by a precise amount as determined by the position sensing electronics within the inertial sensor. Then, the overall servo feedback loop can be used to recenter the arm, and hence the sensor's package, around the proof mass of the inertial sensor.

DETAILED DESCRIPTION OF THE DRAWINGS

FIG. 1 shows the components of a typical disk drive, with inertial sensor attached.

FIG. 2 schematically shows a portion of the surface of a disk, showning several servo marks and tracks of user data.

FIG. 3 shows a schematic of an inertial sensor of the type that could be used for this invention.

DETAILED DESCRIPTION OF THE INVENTION

FIG. 1 shows a typical disk drive showning disk surface 32 having inner diameter 20 and outer diameter 22. Read/write head 26 is located at the end of arm 28, which is connected to actuator 30 to provide a controlled pivoting motion about pivot point 29. Inertial sensor 24 is preferably located on head 26, but practically, is can be located at any position along arm 28.

At its simplest level, the invention consists of mounting an inertial sensor 24 on the positioning arm of a disk drive and using the inertial sensor to provide highly accurate information about movements of the arm during servo writing. Preferably, inertial sensor 24 is some form of accelerometer, as shown in FIG. 3 and described below. Although this type of sensor cannot provide an absolute position reference, it can provide relative reference from a known position. Fortunately, nearly all disk drives provide a crash stop at inner diameter 20 of disk 32 and either a crash stop or a head lifting mechanism at outer diameter 26 of disk 32. Thus there are at least one or two absolute position references on the disk drive.

FIG. 3 shows a simplifed model of an inertial sensor 24 that could be used for this application. Generally, such a sensor could consist of a suspended proof mass 40, spring 42 for the mechanically positioning the proof mass and electrically connecting to it, a mechanical damping mechanism 44, an electronic position sensor 46, which is capable of sensing the position of proof mass 40 with respect to the frame 48 of the inertialsensor, and a force feedback mechanism 48, which can apply forces on proof mass 48 based on the sensed position of proof mass 40 with respect to frame 48.

FIG. 2 shows several tracks of a typical disk, showing repeating servo marks 10 and 12, between areas of user data 14. Servo mark 10 comprises frequencies f1 and f2, while servo mark 12 comprises frequencies f3 and f4. Note that this is a typical servo pattern, and that the current invention is not limited thereto, but can be used for writing servo marks of any particular pattern. To write the servo pattern, write head 16 writes frequency f1 over the entire with of track 10. Write head 16 is then moved outward one half of the width of a track and a full track's width of frequency f2 is written. The same happens for the writing of frequencies f3 and f4 and so on down successive tracks of the disk, with write head 16 moving over one half of a track width each time.

The basic method is to use the inertial sensor output to indicate relative motion from the inner crash stop of disk 32 in place of the signal normally derived from the laser interferometer. For example, the inner-most track of the sector servo pattern could be written by moving an amount measured using inertial sensor 24 outward from the inner crash stop and then holding arm 28 as motionless as possible as the entire sector servo marks (or one frequency of the sector servo marks) for the entire track are written.

Arm 28 is held as motionless as possible using a force feedback mechanism, which is part of the present invention. As any radial motion is detected by inertial sensor 24, a force is applied to arm 28 by actutor 30 to compensate for the movement. Thus, the head travels from servo mark to servo mark in the same track in a "closed-loop" manner, in much the same was as in the laser interferometer assisted method of the prior art, and in opposition to the "open loop" manner as used in previous attempts to do self servo writing, as described above.

The head is moved a precise radial amount the magnitude of which is dependent on the type of sector servo pattern being written (e.g., for the frequency pattern described above and shown in FIG. 2 it would be exactly half of the desired track width), using the inertial sensor to determine the motion. This process would be repeated until sector servo marks had been written on the entire disk surface.

One difficulty with the use of the inertial sensor is error induced by noise. The power spectral density of the noise from an ideal accelerometer typically decreases as the $4^{th}$ power of frequency. Another way of saying the same thing is that the inertial sensor's estimate of the output will be fairly accurate for short times, but the position error due to noise will grow rapidly with time. Frequent recalibration of the sensor's indicated position, velocity, and acceleration errors can alleviate this problem by removing the low frequency components of the noise. For example, during sector servo writing, after each revolution is completed, the beginning of the circumference just written could be read by read head 18. Reading one or a few sector servo marks and using the disk drives position error sensor (PES) output to provide actual position data would allow the position, velocity, and acceleration errors of the sensor to be recalibrated before the next circumference of the sector servo pattern is written. After recalibration, the head could be moved outward by the desired faction of a track using the inertial sensor to control position and a new circumference of the desired sector servo pattern could be written. Using this approach, the noise errors in the inertial sensor never grow for more than one revolution.

If even more frequent recalibration is desired, the disk can be divided up into pie shaped segments, each of which represents the period of time for which the output of the sensor remains within an acceptable error bound after calibration. The portion of a track of sector servo marks lying within one of these pie shaped wedges is written without recalibrating the inertial sensor. However, at the beginning of the next pie shaped wedge (or skipping one depending on the timing) the head is moved back inward by the desired fraction of a track, the position, velocity, and acceleration errors are all calibrated by reading the previously written track of sector servo marks, and then the head is moved out by the desired fraction of a track and the sector servo marks lying on that track within that pie shaped slice of the disk are written using the inertial sensor.

This frequent sampling and cancellation of the inertial sensor's noise as it impacts the position, velocity, and acceleration signals is key to allowing low cost sensors of the type that can be manufactured today to control the writing of the sector servo marks with the precision needed in today's disk drives. Note that many possibilities besides the one above exist for reference marks that are used to calibrate the position, velocity, and acceleration errors of the sensor. Several of them will be described in more detail herein.

One possible non-ideality of inertial sensors is an offset error in the acceleration, velocity or position of the suspended mass relative to the body of the inertial sensor. Unfortunately, a non-zero value of either acceleration or velocity will result in a position error that grows linearly in time for a velocity error and quadratically in time for an acceleration error. Any fixed position reference can be used to measure and remove position, velocity and acceleration offsets. For example, the inner crash stop provides a fixed position reference. By holding the head against the inner crash stop with a small actuator force and waiting until any vibrations have died out, the head and arm are at a known position, zero velocity, and zero acceleration. By measuring the position, velocity, and acceleration indicated by the inertial sensor under this condition and subtracting these offsets, the non-ideality of the inertial sensor can be substantially reduced.

Another possible position reference for such calibration is any sector servo mark written on the disk. Since the PES generated by the disk drive signal processing hardware will indicate the position of the head each time a sector servo mark is read, by re-reading the same sector servo mark again and again we know that the arm must be in a known position over that sector servo mark and at zero velocity and zero acceleration.

A further non-ideality that occurs in inertial sensors is an error in the scale factor (the gain) of the sensor, in acceleration, velocity, or position—though typically the most significant scale factor error is in the acceleration signal since that typically depends on the exact mass of the suspended structure which may be subject to significant manufacturing variations. In this claim, we address the on-site calibration of the scale factor of the acceleration signal from the inertial sensor. Note, we assume that the offset signals in position, velocity, and acceleration have all been measured and will be cancelled by some mechanism. Calibration then requires the movement between two known positions with any desired pattern of acceleration and deceleration.

For example, because the distance between the head lifting fingers at outer diameter 26 of disk 32 and the crash stop at inner diameter 20 of disk 32 is known, head 26 can be positioned starting at the head lifters, accelerated inward at a known acceleration for a fixed time, then decelerated at an equal and opposite decelleration for a slightly shorter time, and using inertial sensor 24 to determined the eact time at which the inner crash stop is touched. Note that the scale factor error can be estimated from this experiment, adjusted, and then the process repeated until head 26 contacts the crash stop at exactly the predicted point in time. Note that other position reference can be used to calibrate the scale factor error. For example, if a laser interferometer was used to write a track of sector servo marks at two desired radii on disk 32, then the above calibration method would allow the scale factor error to be computed by starting at one track of sector servo bursts, following a known motion profile, and observing the time at which the second track of sector servo bursts was crossed.

One approach in the use of the inertial sensor-assisted servo writing is to continue to use a laser interferometer to write sector servo marks that are precisely placed on the disk. However, when the disk drive is also equipped with an inertial sensor, the laser interferometer can be used to write many fewer sector servo marks, thereby dramatically decreasing the time that an individual disk drive must spend on the expensive laser interferometer servo writer. For example, the laser interferometer servo writer might be used to write every $10^{th}$ track of sector servo marks. These precisely written marks could then be used for both offset and gain calibration of the sensor as well as for frequent recalibration of noise induced offsets in position, velocity, and acceleration. Then during the burn-in process the inertial sensor could be used to position the head precisely while filling in the 9 tracks of sector servo marks in between the ones written by the laser interferometer servo writer. In this case the head could be moved back over the laser written marks as often as desired in order to remove the impact of noise on the sensor's position, velocity, and acceleration signals.

Another approach is to make use of the off-track response of the PES. This has the weakness that it relies on the width of the reader element to set the accuracy of the track pitch. However, because the reader and writer are patterned separately, the track pitch as determined by the reader may not match the design track pitch of the disk drive. On the positive side, using the PES has the advantage that no time is required to move by the desired fraction of a track—the head is already there. All the inertial sensor has to do is to hold the position steady while new sector servo marks are being written. Note, prior art techniques have proposed the use of the PES off-center response for self servo writing. However, the accumulation of PES errors tends to lead to the track eventually becoming so badly off center that it cannot be tracked by the srvo loop. By using the inertial sensor to maintain the circularity of the servo marks while using the PES off-center response to precisely determine the track pitch we can obtain an acceptable self servo writing in which the read head determines the track pitch.

The scope of this invention is embodied in the claims that follow. No limitation should be implied by the example of a servo pattern described herein, or by the description of a typical inertial sensor as described herein. This invention is intended to be general enough to be used to write servo marks of any pattern, using any suitable inertial sensor.

I claim:

1. In a disk drive having an inertial sensor disposed on the head thereof, a method for writing servo marks on said disk comprising the steps of:
    a. moving said head to a known radial position;
    b. writing one or more servo marks or fractional portions of one or more servo marks on said disk while holding said head at a constant radial position and applying a feedback force to said head, based on movements of said head detected by said inertial sensor, to prevent or minimize changes in said radial position;
    c. moving said head to a known radial position;
    d. determining the position of said head relative to said known position;
    e. applying a combination of accelerating and decelerating forces to said head, guided by said inertial sensor, to move said head radially to a radial position offset relative to said known position;
    f. repeating steps b through d until all of said servo marks have been written.

2. The method of claim 1 wherein the step of determining the position of said head relative to a known radial position comprises the step of reacting to a position error signal from said drive.

3. The method of claim 1 wherein said steps of applying said acceleration and deceleration forces includes the step of obtaining feedback from said inertial sensor to gauge the correct application of force.

4. The method of claim 1 wherein said step of moving said head to a known radial position comprises the step of moving said head to a position selected from a group comprising the inner diameter of said disk, the outer diameter of said disk and previously written servo marks.

5. The method of claim 1 further comprising the step of initially calibrating the scale factor for said inertial sensor.

6. The method of claim 5 wherein said calibration step comprises the steps of
    a. moving said head to a first known location;
    b. applying a measured accelerating force to said head for a precise period of time;
    c. applying a measured decelerating force to said head for a precise period of time until a second known position is reached; and
    d. repeating steps a through c until said head precisely stops at said second known position.

7. The method of claim 6 wherein said first and second known positions are selected from a group comprising the inner diameter of said disk, the outer diameter of said disk and previously written servo marks.

8. The method of claim 1 further comprising the step of initially calibrating the offset error for said inertial sensor.

9. The method of claim 8 wherein said calibration step comprises the steps of
    a. holding said head in a stationary position;
    b. reading said inertial sensor to determine if any acceleration or velocity is erroneously reported; and
    c. offsetting subsequent readings of acceleration and velocity to compensate for said erroneous readings.

10. In a disk drive having an inertial sensor disposed to measure acceleration forces applied to the head thereof, a method for writing servo marks on said disk comprising the steps of
    a. moving said head to a known position;
    b. holding said head at a constant radial position by detecting any radial acceleration of said head using said inertial sensor and applying a feedback force to said head to prevent or minimize said acceleration;
    c. writing a servo mark or a fractional portion of a servo mark on said disk;
    d. waiting until said disk drive rotates to a spot where the next of said servo marks is to be written;
    e. repeating steps b though d until all of said servo marks or fractional portions of all of said servo marks at said constant radial position are written.

11. The method of claim 10 further comprising the steps of
    a. moving said head radially inward or outward;
    b. repeating steps b through e of claim 1; and
    c. repeating steps a and b until all servo marks are written on said disk.

12. The method of claim 11 wherein said step of radially moving said head comprises the steps p of:
    a. reading one or more of said servo marks or fractional portion of said servo marks;
    b. determining the position of said head relative to said read servo marks or fractional portions of said servo marks;
    c. applying one or more forces to said head to move said head radially.

13. The method of claim 12 wherein the step of determining the position of said head relative to said read servo marks comprises the step of reading a position error signal from said drive.

14. The method of claim 12 wherein said step of applying one or more forces comprises the steps of:
    a. applying an accelerating force in the direction of movement to said head for a precise period of time; and
    b. applying a decelerating force to said head for a precise period of time.

15. The method of claim 14 wherein said steps of applying said forces includes the step of obtaining feedback from said inertial sensor to gauge the correct application of force.

16. The method of claim 10 wherein said step of moving said head to a known position comprises the step of moving said head to a position selected from a group comprising the inner diameter of said disk, the outer diameter of said disk and previously written servo marks.

17. The method of claim 10 further comprising the step of initially calibrating the scale factor for said inertial sensor.

18. The method of claim 17 wherein said calibration step comprises the steps of
    a. moving said head to a first known position;
    b. accelerating said head for a precise period of time;
    c. decelerating said head for a precise period of time until a second known position is reached; and
    d. repeating steps a through c until said head precisely stops at said second known position.

19. The method of claim 18 wherein said first and second known positions are selected from a group comprising the inner diameter of said disk, the outer diameter of said disk and previously written servo marks.

20. The method of claim 10 further comprising the step of initially calibrating the offset error for said inertial sensor.

21. The method of claim 20 wherein said calibration step comprises the steps of
    a. holding said head in a stationary position;
    b. reading said inertial sensor to determine if any acceleration or velocity is erroneously reported; and
    c. offsetting subsequent readings of acceleration and velocity to compensate for said erroneous readings.

22. A self-servo writing disk drive adapted to write its own sector servo patterns, the disk drive comprising:
   a. a magnetic head for writing one or more servo tracks onto a recording medium;
   b. an arm for positioning said magnetic head over said recording medium;
   c. an inertial sensor for detecting any radial motion of said head relative to one or more reference structures, and for providing a sensor signal indicative of said motion;
   d. a motion controller for controlling the motion of said arm so that said arm can move said magnetic head onto one or more known radial positions on said recording medium, and so that at each radial position, said head can maintain said head substantially motionless during a time interval sufficient to allow said head to write one or more servo marks or fractional portions thereof onto said recording medium;
   wherein said motion controller includes actuator means for applying, in response to receipt of said sensor signal, a feedback force to said arm so as to compensate for any detected motion of said head as indicated by said sensor signal.

23. A disc drive in accordance with claim 22, wherein said recording medium is substantially disc-shaped.

24. A disc drive in accordance with claim 22, wherein said one or more reference structures comprise at least one of:
   a. a stopping mechanism; and
   b. a head lifting mechanism.

25. A disc drive in accordance with claim 24, wherein said stopping mechanism comprises a crash stop.

26. A disc drive in accordance with claim 22, wherein each of said servo tracks have a radius ranging from an innermost radius to an outermost radius, and wherein said one or more reference structures comprise at least one of:
   a. a crash stop located on said recording medium at said innermost radius;
   b. a crash stop located on said recording medium at said outermost radius; and
   c. a head lifting mechanism located on said recording medium at said outermost radius.

27. A disc drive in accordance with claim 22, wherein said one or more servo tracks have substantially annular configurations, and are concentrically disposed relative to each other.

28. A disk drive in accordance with claim 22, wherein said inertial sensor comprises:
   a. a frame structure;
   b. a proof mass suspended with respect to said frame structure;
   c. sensing means for sensing a displacement of said proof mass with respect to an equilibrium position of said proof mass relative to said frame structure;
   d. force feedback means for applying, in response to the sensed displacement, a feedback force to said proof mass so as to restore said proof mass to said equilibrium position.

29. A disc drive in accordance with claim 28, further comprising means for calibrating and removing offset error in said inertial sensor, including:
   a. means for maintaining said head substantially motionless with respect to at least one position reference item until any vibrations of said head and said arm are substantially eliminated and said head and said arm reach a substantially stationary state characterized by substantially zero velocity and substantially zero acceleration; and
   b. measurement means for measuring at least one of the velocity, and acceleration of said proof mass of the inertial sensor while said head is in said substantially stationary state; and
   c. means for subtracting from subsequent readings of said inertial sensor any non-zero values of said velocity and said acceleration measured by said measurement means.

30. A disc drive in accordance with claim 29, wherein said offset error is an offset error in at least one of the acceleration, velocity, and position of said proof mass relative to said frame structure.

31. A disc drive in accordance with claim 29, wherein said position reference item comprises at least one of:
   a. a crash stop; and
   b. a sector servo mark written on said recording medium.

32. A disc drive in accordance with claim 28, further comprising calibration means for calibrating a scale factor error in said inertial sensor, said calibration means including;
   b. means for moving said head to a first predetermined location;
   c. means for applying a known accelerating force to said head during a first time interval;
   d. means for applying an equal and opposite decelerating force to said head during a second time interval until said head contacts a second predetermined location, said second time interval being less than said first time interval;
   e. means for computing said scale factor error by determining the time point at which said head contacts said second predetermined location, and comparing said time point with a predicted time point; and
   f. means for adjusting the scale factor of said inertial sensor to compensate for said computed scale factor error.

33. A disc drive in accordance with claim 22, wherein said arm is rotatably and pivotably mounted about a pivot point.

34. A disc drive in accordance with claim 22, wherein said magnetic head is affixed onto a distal end of said arm.

35. A disc drive in accordance with claim 22, wherein said inertial sensor is mounted on at least one of said arm and said head.

* * * * *